(12) United States Patent
Sabev

(10) Patent No.: US 8,171,486 B2
(45) Date of Patent: May 1, 2012

(54) CONDITIONALLY ACCESSING INSTANCES OF SOFTWARE COMPONENTS FROM AN UN-SYNCHRONIZED POOL

(75) Inventor: Hristo K. Sabev, Bourgas (BG)

(73) Assignee: SAP AG, Walldorf (DE)

( * ) Notice: Subject to any disclaimer, the term of this patent is extended or adjusted under 35 U.S.C. 154(b) by 1251 days.

(21) Appl. No.: 11/232,658

(22) Filed: Sep. 21, 2005

(65) Prior Publication Data

US 2007/0169122 A1   Jul. 19, 2007

(51) Int. Cl.
*G06F 9/44* (2006.01)
(52) U.S. Cl. ........................................... 718/105
(58) Field of Classification Search .................. 718/105
See application file for complete search history.

(56) References Cited

U.S. PATENT DOCUMENTS

| | | | | |
|---|---|---|---|---|
| 5,129,084 | A * | 7/1992 | Kelly et al. | 718/104 |
| 6,021,470 | A * | 2/2000 | Frank et al. | 709/203 |
| 6,738,977 | B1 * | 5/2004 | Berry et al. | 718/1 |
| 7,080,382 | B2 * | 7/2006 | Sexton et al. | 717/114 |
| 7,243,352 | B2 * | 7/2007 | Mandava et al. | 718/104 |
| 7,246,135 | B2 * | 7/2007 | Reid | 718/102 |
| 7,523,472 | B2 * | 4/2009 | D'Souza et al. | 719/331 |
| 7,562,370 | B2 * | 7/2009 | Moore et al. | 719/330 |
| 7,581,225 | B2 * | 8/2009 | Ahmad et al. | 719/314 |
| 2001/0047436 | A1 * | 11/2001 | Sexton et al. | 709/316 |
| 2002/0133527 | A1 * | 9/2002 | Daynes et al. | 709/100 |
| 2003/0208641 | A1 * | 11/2003 | Wesemann | 709/332 |
| 2004/0015921 | A1 * | 1/2004 | Daynes et al. | 717/162 |
| 2004/0103413 | A1 * | 5/2004 | Mandava et al. | 718/100 |
| 2005/0060725 | A1 * | 3/2005 | D'Souza et al. | 719/331 |
| 2005/0246678 | A1 * | 11/2005 | Moore et al. | 717/102 |
| 2005/0262493 | A1 * | 11/2005 | Schmidt et al. | 717/164 |
| 2006/0248530 | A1 * | 11/2006 | Ahmad et al. | 718/102 |

OTHER PUBLICATIONS

Zhang, W., B. Yang, B. Jin, N. Chen, and T. Huang, "Performance Tuning for Application Server OnceAS", in Parallel and Distributed Processing and Applications Second International Symposium, ISPA 2004. Published Jan. 17, 2005, Springer. pp. 451-462. Retrieved from www.springerlink.com on Aug. 25, 2011.*

* cited by examiner

*Primary Examiner* — Li Zhen
*Assistant Examiner* — Erika Kretzmer
(74) *Attorney, Agent, or Firm* — Schwegman, Lundberg & Woessner, P.A.

(57) ABSTRACT

A method is described that involves creating an instance of a software component for the substantially private use of a thread. A determination of whether to access an instance of a software component from one of a private software component instance collection and a software component instance pool is made, the private software component instance collection configured to include an instance of the software component that is not synchronized with an additional thread of the computer program, the software component instance pool configured to include an instance of the software component that is synchronized with the additional thread of the computer program, the determination based on a number of other threads accessing the software component instance pool and a complexity of whether the instance of the software component is to execute at least one of a single task and a few simple tasks.

14 Claims, 4 Drawing Sheets

CONDITIONALLY ACCESSING INSTANCES OF SOFTWARE COMPONENTS FROM AN UN-SYNCHRONIZED POOL

BACKGROUND

1. Field of the Invention

This invention relates generally to the field of data processing systems. More particularly, this invention relates to a system and method for non-synchronous access to a software component instance pool.

2. Description of the Related Art

With the advent of software components, developing distributed enterprise software applications has become simpler. Software components are portions of pre-written software code that can be used and reused by the software developer. Thus, software components allow software developers to concentrate on the more custom aspects of their program while the more tedious tasks of the program are done for them via components. For example, in the Java programming environment, enterprise java beans work as software components.

There are three types of enterprise java beans: session, message-driven, and entity beans. Session beans typically execute a single task for a single client during a session. Message-driven beans also typically execute a single task for a single client where the task is processing messages sent to or from another bean, an application client, or others. An entity bean is a persistent object which represents data (for example, customers, products, orders, and etc.) stored within a database.

"Pooling" (sharing) objects in a distributed enterprise application will decrease the amount of computer resources required to perform a task. For example, execution time and memory generally decrease when pooling is implemented. There may be multiple pools in a distributed enterprise software application. For example, the Java 2 Enterprise Edition ("J2EE") engine uses many different object pools. There are pools for application threads, large data arrays, enterprise java beans ("EJB"), and others.

An application thread is a part of a computer program that can run independently and concurrently with other parts of the computer program. In a complex distributed software application, there may be several threads running independently or concurrently with other threads.

FIG. 1 is a prior art implementation illustrating threads accessing software component instances in a distributed enterprise software application. Threads 101_1, 101_2, ..., 101_N are in thread pool 110. The threads in thread pool 110 share software component pool 114. A thread must gain access to software component pool 114 upon a request for a software component instance. Software component instances 103_1, 103_2, ..., 103_P are arranged in software component instance stack 112 within software component pool 114. A thread from thread pool 110 will "pop" (remove) a software component instance from software component instance stack 112 upon request and will "push" (return) the software component instance back onto the software component instance stack 112 when the thread is finished with the instance.

Pooling software components comes at a cost, however. Access to software component pool 114 is synchronized because it is shared between threads 101_1, 101_2, ..., 101_N. Synchronization is a scheme where only one thread has access to an object (in this case software component instance stack 112) at any given time. Popping or pushing software component instances from software component instance stack 112 will cause other threads to wait until the popping or pushing action is complete before they can access the pool. Distributed enterprise software applications can be quite complex; consequently it is not unusual to have several threads waiting for a single thread to finish popping or pushing software component instances from software component instance stack 112. This waiting time increases the time necessary for threads to complete their actions.

In a distributed enterprise software application this synchronization can act as a bottleneck. For example, this bottleneck is apparent in a J2EE application during times of heavy load (where many threads are accessing software component pool 114). A thread, upon a request for a software component from software component pool 114, will be required to wait until other threads have finished accessing software component pool 114. If the request is for a session bean or a message-driven bean, where each bean instance is used to process a single request and generally requires very short execution times, a thread may spend more time waiting to access a session bean or message-driven bean than it would spend using the session bean or message-driven bean.

BRIEF DESCRIPTION OF THE DRAWINGS

The present invention is illustrated by way of example, and not limitation, in the figures of the accompanying drawings in which like references indicate similar elements and in which.

SUMMARY

Figure 1:
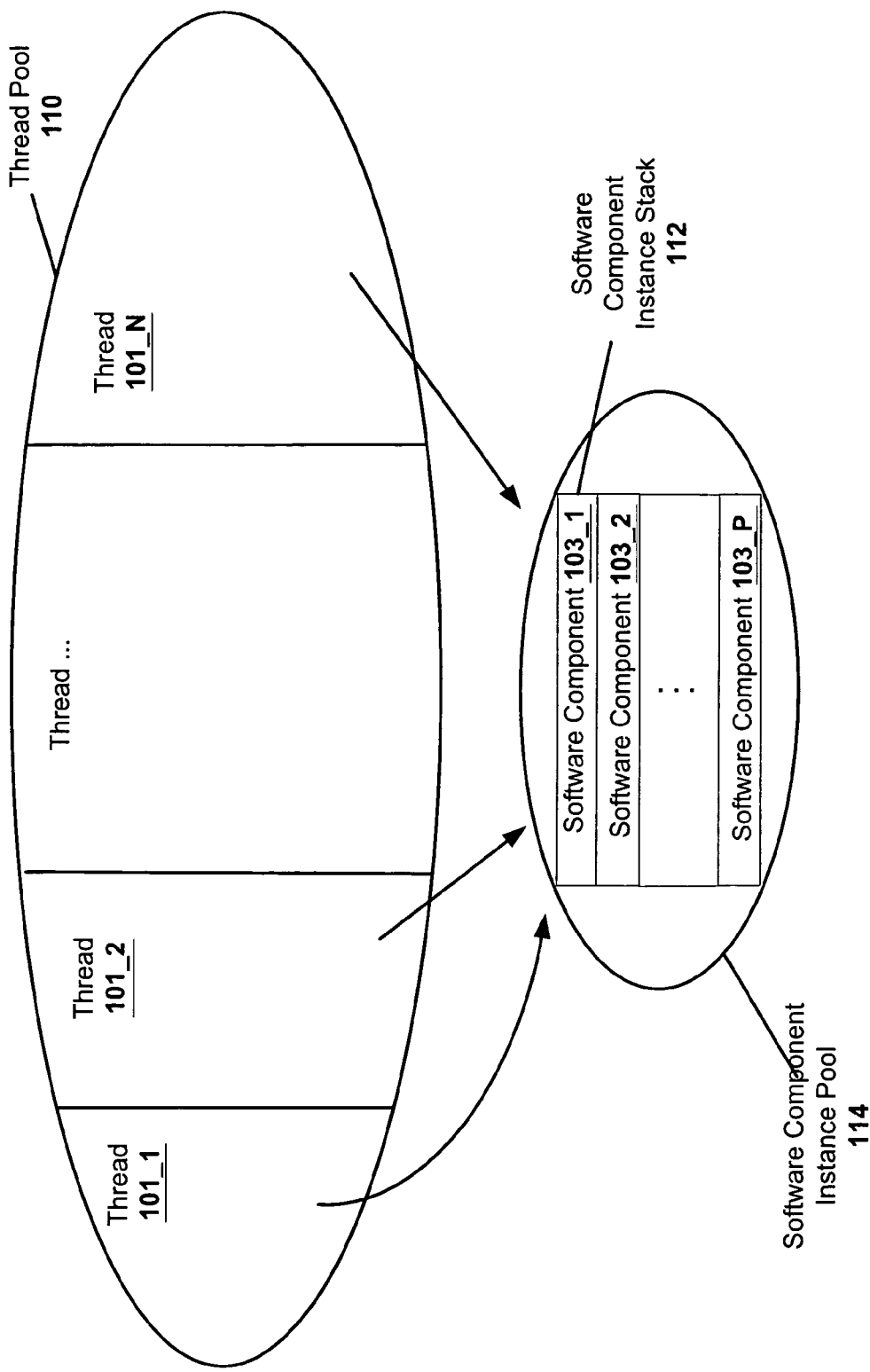
FIG. 1 (prior art) illustrates synchronous access to a software component instance pool.

A method is described that involves creating an instance of a software component for the substantially private use of a thread. A determination of whether to access an instance of a software component from one of a private software component instance collection and a software component instance pool is made, the private software component instance collection configured to include an instance of the software component that is not synchronized with an additional thread of the computer program, the software component instance pool configured to include an instance of the software component that is synchronized with the additional thread of the computer program, the determination based on a number of other threads accessing the software component instance pool and whether the instance of the software component is to execute at least one of a single task and a few simple tasks.

DETAILED DESCRIPTION

Described below is a system and method for non-synchronous access to software component instances within an enterprise application. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

A thread can avoid synchronization delays associated with pooling software component instances if one or more software component instances are substantially private to that thread. That is, for example, if one or more software component instances are in a thread's collection being available only to that thread (i.e., are "unshared"). A private thread collection is the architectural opposite of pooling and therefore does not require synchronization. Because synchronization is avoided, the execution time of the thread will decrease, thus improving the efficiency of the thread. Note that for any software system being designed, varying specifications may be considered as to which and/or how many software component instances used by a thread are made substantially private to that thread. By way of example and not limitation, whether a software component instance is made substantially private depends on the type of software component.

A thread may create a software component instance for its private use when the type of software component requested is used for a single task. In times of heavy load (many threads accessing the software component instance pool which may create access delays) it may take less time to create and use a software component instance that executes a single task than it would take to access the software component instance pool. Avoiding accessing the synchronized software component instance pool for a software component instance that executes a single task that will be used for a single task may therefore improve the efficiency of the thread and reduce the time necessary for the thread to finish its task. By way of example and not limitation, in a Java application, message-driven and session java beans are generally used for a single task. Therefore, in a Java application, upon a thread's request for a message-driven or a session java bean, the thread may create the particular bean instance it requested.

The idea expressed may be more broadly stated as follows: if the type of software component requested is to be used for a short amount of execution time (e.g., through execution of a single task, a few "simple" tasks, etc.), a thread may create the software component instance for its private use instead of accessing the software component instance pool. In times of heavy load, creating a software component instance that will be used for a short amount of execution time for the private use of a thread may decrease the time the thread needs to finish executing (running) as the thread will not wait to access the software component instance pool. By way of example and not limitation, in a Java application, message-driven and session java beans are generally used for a short amount of execution time. Therefore, in a Java application, upon a thread's request for a message-driven or a session java bean, the thread may create the particular bean instance it requested.

According to another approach, if the number of software component instances requested by a particular thread is large then that thread may access the software component instance pool, rather than create private instances of them, even if these components have short execution times. While the thread may have to wait for access to the software component instance pool, generally accessing the software component instance pool is more resource efficient and will take less time than creating a large number of software component instances. By way of example and not limitation, in a Java enterprise application, a "finder method" returns large amounts of data from a database. To accomplish this, a particular thread often requests a large number of entity beans. Therefore a thread running a "finder method" that requires a large number of entity beans may access the bean instance pool.

According to another approach, a thread will access components having "long" execution times from the software component instance pool (e.g., component instances of "short" execution time are kept in a private pool while instances of components having "long" execution times are accessed synchronously from a component instance pool).

Therefore, in certain circumstances, a particular thread may access the software component instance pool and in other circumstances the thread may create a requested software component instance and place it into its private thread collection. This may maximize the efficiency of a particular thread which will decrease the time needed for the thread to finish its task.

Figure 2:
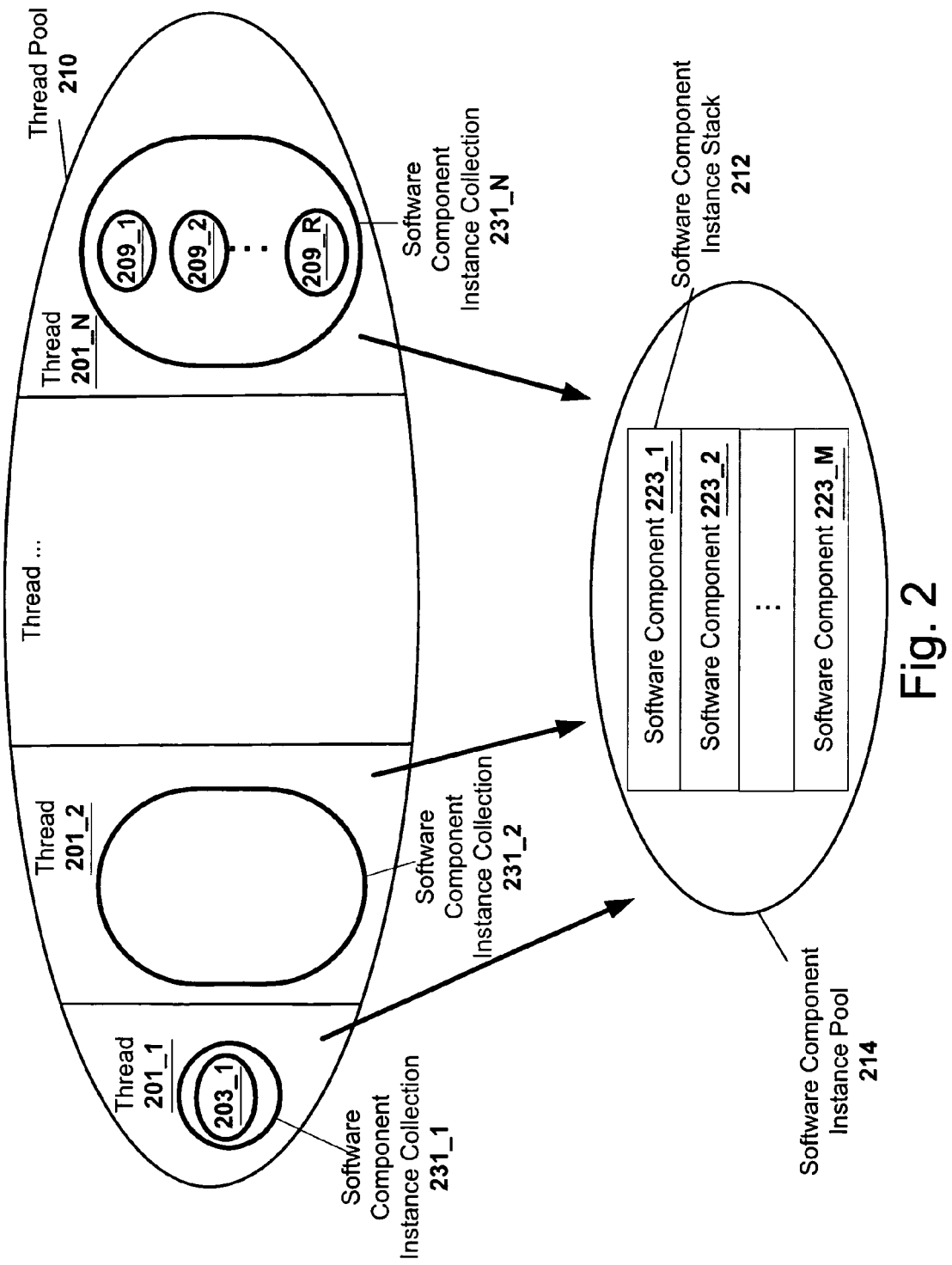
FIG. 2 illustrates non-synchronous access to a thread's collection of software component instances along with synchronous access to a software component instance pool.

FIG. 2 illustrates an approach that, for a particular thread, contemplates both private (non-synchronized) access to software component instances along with pooled (synchronous) access to software component instances. Here, threads $201\_1$, $201\_2, \ldots, 201\_N$ form thread pool 210. Thread $201\_1$ has software component instance $203\_1$ in its private software component instance collection $231\_1$. Thread $201\_2$ does not have any software component instances in its private software component instance collection $231\_2$. Thread $201\_N$ has R software component instances $209\_1, 209\_2, \ldots, 209\_R$ in its private software component collection $231\_N$. Threads $201\_1, 201\_2, \ldots, 201\_N$ may share software component instances $223\_1, 223\_2, \ldots, 223\_M$ in software component instance pool 214.

If, for example, thread $201\_2$ requests a type of software component that is used to execute a single task or is used for a short amount of execution time (e.g., a java message-driven bean or a java session bean) thread $201\_2$ will create a software component instance for its use and will not access the software component instance pool 214. If thread $201\_2$ requests a large amount of software component instances (e.g., large amounts of entity bean instances used for a "finder method") thread $201\_2$ will access software component instance pool 214 and will not create software component instances for its private use.

A thread may begin with an empty software component instance collection in one embodiment. For example in FIG. 2, thread $201\_2$ has no software component instances in its private software component instance collection $231\_2$. According to one approach, the thread will create multiple software component instances for its collection at the time or soon after the thread is created (e.g., one software component instance for each of those types of software components that are deemed appropriate for private use of a thread), regardless if a request for software component for any of the instances was actually made.

A thread may use a software component instance it has previously created and/or one that is in its private software component instance collection upon a request for a software component of the type in the software component instance collection. For example, thread $201\_1$ may use software component instance $203\_1$ in its private software component instance collection $231\_1$ upon a request for a software component of the type of $203\_1$. By way of example and not limitation, a Java thread that requests a single message-driven bean or a session bean and has that particular type of bean instance in its private bean instance collection will use that instance instead of creating a new instance or accessing a bean pool.

In an alternative approach, private instances of components are created on an "as-needed" basis (e.g., at the time or shortly after a request for the component is made).

In one approach, a thread may access the software component instance pool upon a request for more software component instances than the thread currently has in its thread collection. For example, thread 201_N has R software component instances in its thread collection 231_N. If thread 201_N requests more than R software component instances, the thread will access software component instance pool 214. If thread 201_N requests a number less than or equal to R of software component instances, the thread will use the software component instances in its collection.

Figure 3:
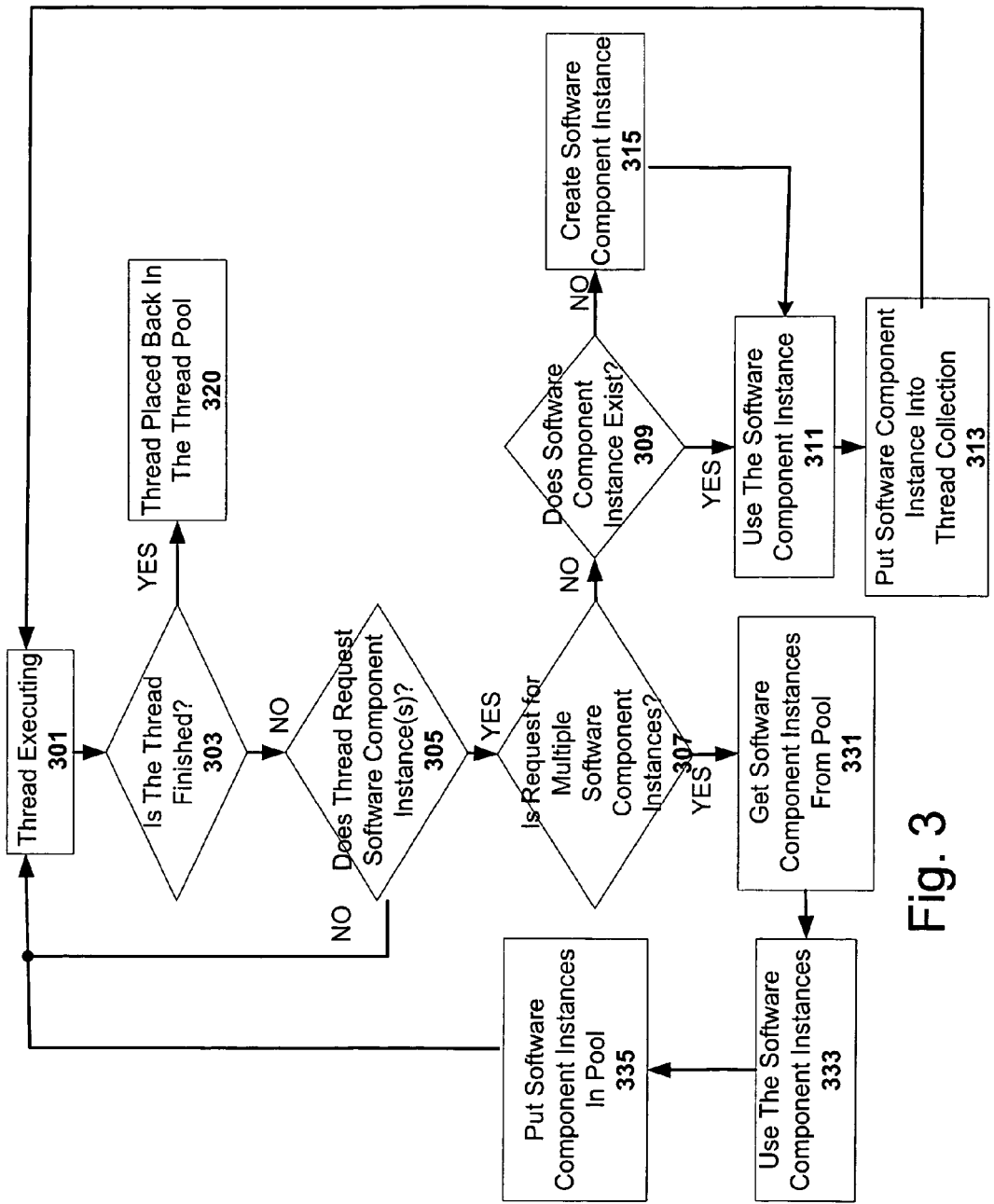
FIG. 3 illustrates one embodiment of a thread's lifecycle.

FIG. 3 is a flowchart which illustrates an exemplary method of non-synchronous access for software component instances within a thread's private software component instance collection along with synchronous access for software component instances in software component instance pool 214. According to the approach of FIG. 3, a thread may access the software component instance pool 214 upon a request for more than one software component instance.

According to the process of FIG. 3, a thread is initially executing 301. If the thread is finished executing, it will be placed back 320 into the thread pool 210. If the thread is not finished executing, a determination is made 305 whether a thread requests a software component instance. If the thread requests a software component instance, a determination is made 307 whether a thread requests multiple software component instances. If multiple software component instances are requested, at 331 the thread will get the requested software component instances from software component instance pool 214. The thread will then use the software component instances 333 and will put the software component instances back into the software component instance pool 214 when it is finished using the software component instances 335. If the thread does not request multiple software component instances 307, a determination is made 309 whether the software component instance exists in the thread's private collection. If the software component instance exists, the thread will use the software component instance 311. If the software component instance does not exist, the thread will create the software component instance 315, and use the created software component instance 311. When the thread is finished using the software component instance, it will put the software component instance into the thread's private collection 313.

A thread and any software component instances it created will be removed once the thread is removed from thread pool 210 in one embodiment. In an alternative embodiment, a software component instance in a thread's collection will not be destroyed once a thread is removed from thread pool 210 if the software component instance has a strong reference. In another embodiment, when multiple instances are requested, the necessary software components are created and have a weak reference to them. Thus, the garbage collector is not prohibited from killing these objects once the thread stopped using them.

A child thread (a thread created by a parent thread (another thread)) will inherit the software component instances the parent thread has created in one embodiment. That is, a child thread would receive copies of the software component instances the parent thread created. In another embodiment, a child thread will share access with the parent thread to the software component instances the parent thread created. In another embodiment, a child thread will not inherit or be able to access the software component instances created by a parent thread, thus a child thread will need to create its own software component instances.

Processes taught by the discussion above may be performed with program code such as machine-executable instructions which cause a machine (such as a general-purpose processor disposed on a semiconductor chip, a special-purpose processor disposed on a semiconductor chip, or an abstract execution environment (e.g., a "virtual machine", an interpreter, a Common Language Runtime, a Java Virtual Machine, etc.)) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 4:
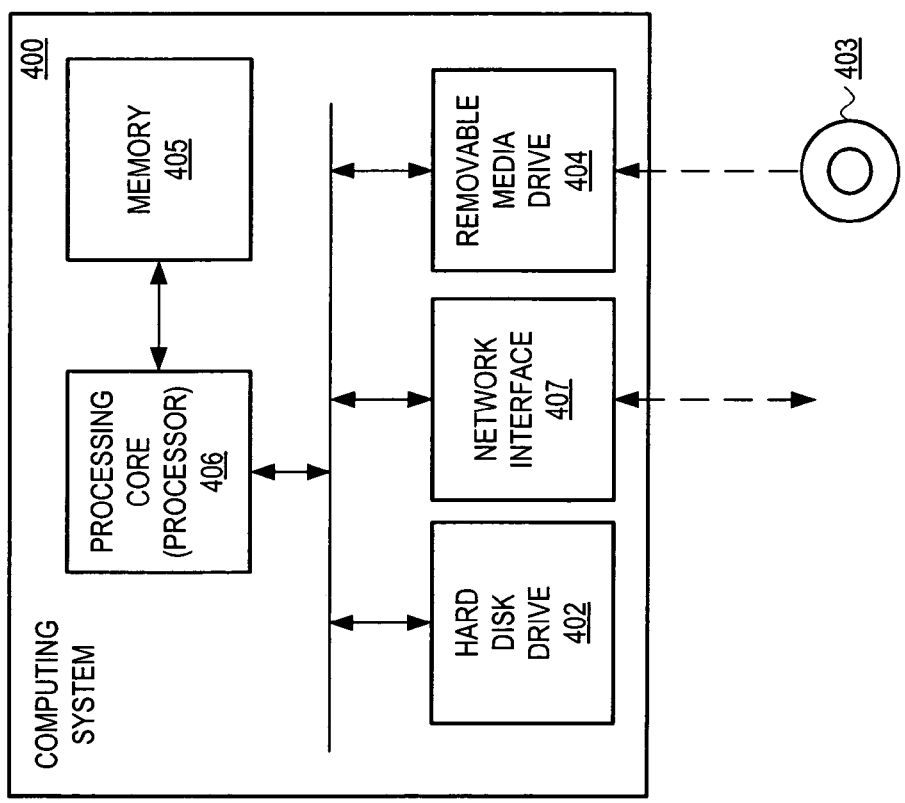
FIG. 4 illustrates an embodiment of a computing system's hardware design.

FIG. 4 is a block diagram of a computing system 400 that can execute program code stored by an article of manufacture. It is important to recognize that the computing system block diagram of FIG. 4 is just one of various computing system architectures. The applicable article of manufacture may include one or more fixed components (such as a hard disk drive 402 or memory 405) and/or various movable components such as a CD ROM 403, a compact disc, a magnetic tape, etc operable with removable media drive 404. In order to execute the program code, typically instructions of the program code are loaded into the Random Access Memory (RAM) 405; and, the processing core 406 then executes the instructions. The processing core 406 may include one or more processors and a memory controller function.

It is believed that processes taught by the discussion above may be practiced using various object-orientated and non-object-orientated computer programming languages (e.g., Java, C#, VB, Python, C, C++, J#, APL, Cobol, Fortran, Pascal, Perl, etc.) under various software development frameworks (e.g., NET, Mono, Java, etc.). The source code from these computer programming languages may be converted into an intermediate form (such as Java byte code, Microsoft Intermediate Language, etc.) that is understandable to an abstract execution environment (e.g., a Java Virtual Machine, a Common Language Runtime, a high-level language virtual machine, an interpreter, etc.).

The abstract execution environment may convert the intermediate form of source code into machine level code by, 1) compiling the intermediate form of source code (e.g., at run-time (e.g., a JIT compiler)), 2) interpreting the intermediate form of source code, or 3) a combination of compiling the intermediate form of source code at run-time and interpreting the intermediate form of source code. The resulting machine level code will be understandable to the specific processor(s) of the processor core 406. Abstract execution environments may run on various operating systems (such as UNIX, LINUX, Microsoft operating systems including the Windows family, Apple Computers operating systems including MacOS X, Sun/Solaris, OS/2, Novell, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

I claim:

1. A method comprising:
   determining, at a thread of a computer program, whether to access an instance of a software component from one of a private software component instance collection and a software component instance pool, the private software component instance collection configured to include an instance of the software component that is not synchronized with an additional thread of the computer program, the software component instance pool configured to include an instance of the software component that is synchronized with the additional thread of the computer program, the determining based on a number of other threads accessing the software component instance pool and whether the instance of the software component is to execute at least one of a single task and a few simple tasks;
   ascertaining whether the private software component instance collection includes the instance of the software component; and
   creating the instance of the software component for the private software component instance collection based on the ascertaining.

2. The method of claim 1, further comprising removing the instance of the software component from the private software component instance collection based on the thread of the computer program being removed from a thread pool.

3. The method of claim 2, wherein the removing of the instance of the software component from the private software component instance collection is based on the thread of the computer program not having a strong reference to the instance of the software component.

4. The method of claim 1, wherein the determining includes-identifying whether the instance of the software component executes a single task.

5. The method of claim 1, wherein the determining includes identifying whether the instance of the software component is one of a plurality of instances of the software component to be requested by the thread.

6. The method of claim 5, wherein the determining includes detecting whether a count of the plurality of instances of the software component to be requested by the thread is less than or equal to a count of the plurality of instances of the software component in the private software component instance collection.

7. The method of claim 1, wherein the identifying whether the instance of the software component is to execute the at least one of the single task and the few simple tasks is based on whether the software component is one of a message-driven Java bean and a session Java bean.

8. The method of claim 5, wherein the identifying whether the instance of the software component is one of a plurality of instances of the software component to be requested by the thread includes detecting that the thread is running a finder method.

9. A computing system comprising a machine, said computing system also comprising instructions disposed on a computer readable medium, said instructions capable of being executed by said machine to perform a method, said method comprising:
   determining, at a thread of a computer program, whether to access an instance of a software component from one of a private software component instance collection and a software component instance pool, the private software component instance collection configured to include an instance of the software component that is not synchronized with an additional thread of the computer program, the software component instance pool configured to include an instance of the software component that is synchronized with the additional thread of the computer program, the determining based on a number of other threads accessing the software component instance pool and whether the instance of the software component is to execute at least one of a single task and a few simple tasks;
   ascertaining whether the private software component instance collection includes the instance of the software component; and
   creating the instance of the software component for the private software component instance collection based on the ascertaining.

10. The computer system of claim 9, wherein the private software component instance collection is initially empty.

11. The computer system of claim 9, further comprising reusing the instance of the software component based on a need to access the software component.

12. The computer system of claim 9, further comprising removing the instance of the software component from the private software component instance collection based on the thread being removed from a thread pool.

13. An article of manufacture comprising non-transitory machine-readable media storing program code which, when executed by a machine, causes the machine to perform a method, the method comprising:
   determining, at a thread of a computer program, whether to access an instance of a software component from one of a private software component instance collection and a software component instance pool, the private software component instance collection configured to include an instance of the software component that is not synchronized with an additional thread of the computer program, the software component instance pool configured to include an instance of the software component that is synchronized with the additional thread of the computer program, the determining based on a number of other threads accessing the software component instance pool and whether the instance of the software component is to execute at least one of a single task and a few simple tasks;
   ascertaining whether the private software component instance collection includes the instance of the software component; and
   creating the instance of the software component for the private software component instance collection based on the ascertaining.

14. The article of manufacture of claim 13, further comprising reusing the instance of the software component based on a need to access the software component.

* * * * *